Aug. 5, 1969     E. SCHMUED     3,458,940
LEVEL-ESTABLISHING DEVICE
Filed Feb. 10, 1967
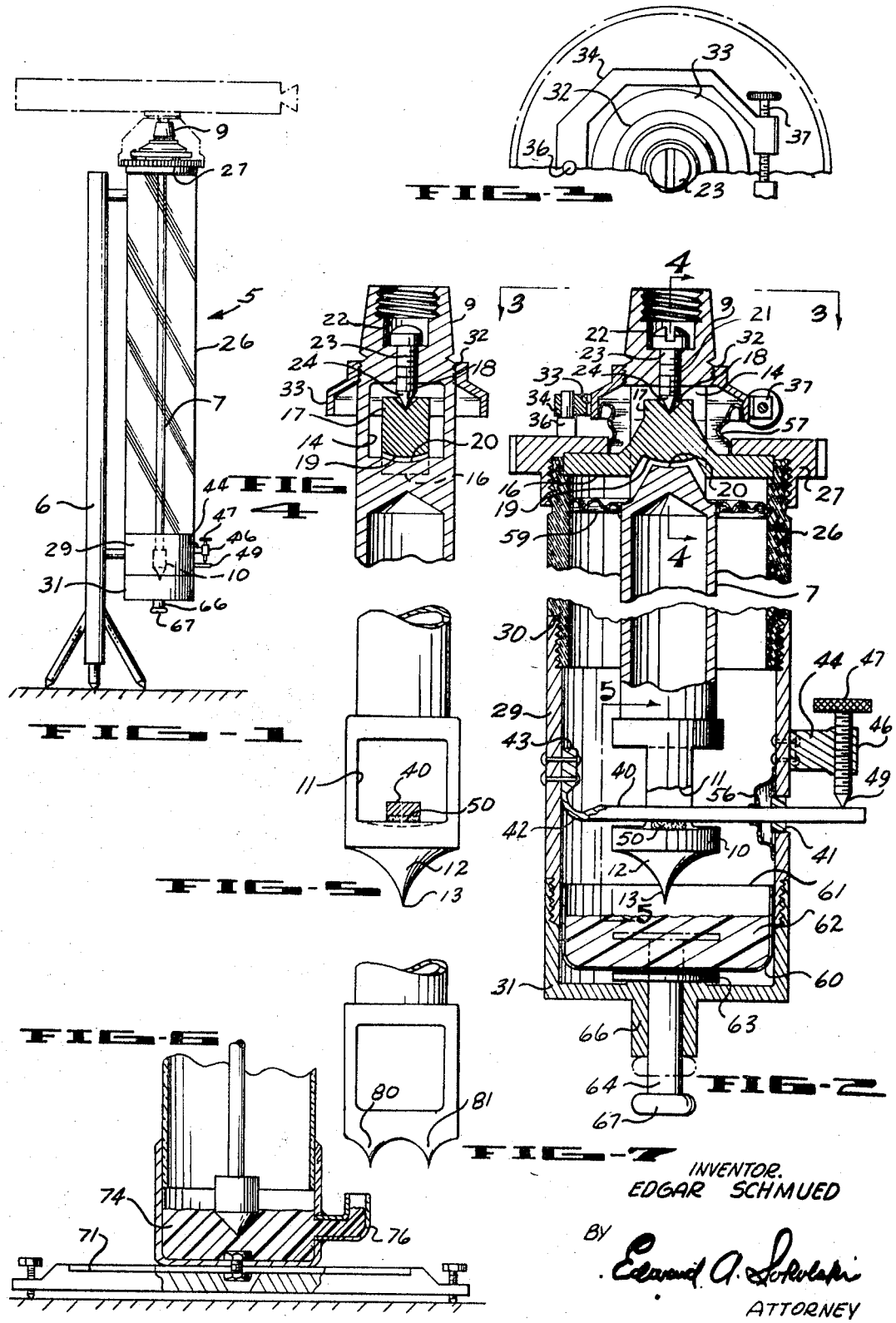
INVENTOR.
EDGAR SCHMUED
BY *Edward A. Sokolski*
ATTORNEY

United States Patent Office 3,458,940
Patented Aug. 5, 1969

3,458,940
LEVEL-ESTABLISHING DEVICE
Edgar Schmued, 5051 Palos Verdes Drive North,
Rolling Hills Estates, Calif. 90274
Filed Feb. 10, 1967, Ser. No. 615,199
Int. Cl. G01c 15/10
U.S. Cl. 33—215     3 Claims

ABSTRACT OF THE DISCLOSURE

A pendulum apparatus used to align the optical axis of an instrument along a horizontal plane normal to the true vertical axis. The instrument features a locking bar extending through an aperature in the bob to allow frictional engagement and a hardening liquid for stabilizing and maintaining the bob in a vertical position. A resilient liquid filled cup allows the application of an intermittent damping force to the bob. Various materials such as glass and plastic beads, sand, liquid, and solidifying fluids are used for damping.

---

A serious disadvantage inherent in prior known devices employed for the location and establishment of the true vertical plane lies in the difficulty in stabilizing the vertical seeking element such as a pendulum or plumb bob, and is further encountered in maintaining the element in precise position once it is aligned with true vertical.

It has been proposed, in the prior art, to suspend a plumb bob in a tank or container of linear liquid, as disclosed for example in U.S. Patent No. 1,952,745, which expedient obviously is impractical because of weight, fluid seals, and the instability of the liquid itself. It is almost as difficult to stabilize the liquid as it is to stabilize the plumb bob. Any motion of the liquid will cause the plumb bob to move.

By linear liquid I mean a liquid having a single physical state up to its boiling point, such as mineral oil and water-based solutions, and by non-linear materials I mean wax, paraffin, asphalt, eutectic metal (Cerrobend), etc., all of which can be reduced to liquid at moderately elevated temperatures and will quickly harden to solids at normal temperature. I have also found that some granular materials such as glass beads or hollow plastic microspheres in quantity behave in a manner quite similar to the foregoing materials, and for practical considerations may be regarded as non-linear. Silicon sand and finely divided metal particles were tried and worked fairly satisfactorily. However, for damping and substantially permanently stabilizing the plumb bob I have found that materials that can be changed from a liquid state to a solid state by coagulation or catalytic reaction within a reasonably short period of time such as the thermosetting plastics or resins are most satisfactory.

Establishing true horizontal planes from a true vertical line or plane with other prior known devices of the type employing a pendulum or plumb bob is time-consuming and unsatisfactory when applied to the support of precision instrumentation; such devices being devices being too easily thrown out of alignment requiring careful readjustment and realignment.

It is an object of my present invention to provide an improved vertical establishing device with positive damping means and method therefor that stabilizes the vertical seeking element quickly and maintains it in its precise position for as long as desired.

It is another object of my present invention to provide an improved level-establishing device with positive damping means that is readily adaptable to align and support optical sighting instruments such as transits, telescopes, bore-sights, missile alignment optics, and the like, with their optical axes precisely aligned normal to a true vertical line or plane.

It is a further object of my present invention to provide a unique damping means and method that can be applied to the simplest plumb bob devices.

Other objects and features of the means and method of my present invention will be readily understood by reference to the ensuing detailed specification and appended drawings in which:

FIGURE 1 is a diagrammatic side elevational view of the level-establishing device of my present invention supported on a tripod for portable use.

FIGURE 2 is a fragmentary side elevational view in cross-section showing the details of construction of the level-establishing device of FIGURE 1 omitting the tripod.

FIGURE 3 is a partial diagrammatic view from the top of FIGURE 2 taken along the lines 3—3.

FIGURE 4 is a cross-sectional view of the pendulum support rotated about its axis 90° as viewed along lines 4—4 of FIGURE 2.

FIGURE 5 is a diagrammatic view of the pendulum bob of FIGURE 2 rotated about its axis 90° as viewed along lines 5—5 in FIGURE 2.

FIGURE 6 is a diagrammatic side elevational view of the level-establishing device of my present invention mounted on a bench plate for stationary employment.

FIGURE 7 is a side elevational view of another form the pendulum bob of the previous figures may take.

As shown diagrammatically in FIGURE 1, the level-establishing device 5 of my present invention adapted for portable employment is mounted on a tripod 6 in any convenient manner such as by brackets for example. The detailed construction of the device 5 is shown in FIGURES 2, 3 and 4 and, as best shown in FIGURE 2, takes the form of a rigid pendulum column or beam 7 provided on its upper end with an instrument adapter 9 on which a transit, telescope, etc. (not shown), can be mounted with its optical axis aligned precisely normal to the axis of the pendulum.

The opposite or lower end of the beam 7 is weighted with a pendulum body or bob 10 through the center of which an eye 11 transversely extends. The bob 10 terminates in a cusp 12 which may be conventionally tapered to a point 13 or may be concavely drawn to a relatively sharp point as shown; the latter providing a damping area of the bob 10 to suit special damping requirements.

Adjacent to the instrument adaptor 9, at the upper end of beam 7, another transversely extending eye 14 is provided through beam 7 through which an arbor 16 is extended, the arbor being formed with a raised boss 17, the upper surface of which is recessed to define a pivot seat 18. The undersurface of arbor 16 is preferably cambered and curved to define a hemispherical ball surface 19 to conform to a concave socket 20 provided in the bottom of beam eye 14 with a clearance therebetween. Completing the beam support, the instrument adaptor 9 has an axial bore 21 extending therethrough and a counterbore 22, the bore 21 being internally threaded to accommodate threaded bolt 23 which is ground and hardened to define a jewel-type pivot point 24 resting in pivot seat 18 in arbor 16. Arbor 16 is mounted over the end of an exteriorly threaded housing sleeve 26, being secured thereto by internally threaded ring 27. The lower end of housing sleeve 26 is fitted with an elongated cylinder 29, abutting a shoulder 30 formed around the periphery of housing sleeve 26 and terminating at its lower end in end cap 31. Thus supported, the pendulum is freely suspended within a housing protected from wind, corrosion, dust, etc., and yet visible from the exterior.

While I have selected for purposes of illustration the relatively simple jewel-type pivot above, other gimbal supports may be employed to suspend the pendulum such as the universal support disclosed in U.S. Patent No. 1,926,538, or the relatively more complicated knife-edge support disclosed in U.S. Patent No. 1,858,384.

To lock the upper end of pendulum beam 7 in position once true vertical is established, I provide a flanged collar 32 formed of a rigid material, threadedly mounted around the beam 7 between adaptor 9 and beam eye 14. Surrounding the spherical flange 33 of collar 32, a split clamp 34 is provided and supported by a post 36 rigidly mounted in ring 27 and accurately located to align the clamp 34 relative to collar flange 33. The clamp 34 is free to rotate around post 36 and is equipped with a lock screw 37 in the conventional manner by which the collar 32 and hence the upper portion of beam 7 can be locked or freed by tightening or loosening lock screw 37, respectively, to engage and disengage clamp 34 with spherical flange 33.

At the lower end of beam 7, which may be made hollow to reduce weight if desired, I mount the pendulum body or bob 10 in any convenient manner, orienting the eye 11 laterally as shown. A lock-bar or lever 40 is extended through an opening 41 provided in the wall of housing cylinder 29, and by means of a curved spring 42 having a mounting block 43, is riveted or bolted to the opposite wall of the housing 29. The spring 42 may be integrally formed on lever 40 or may be fabricated separately and fastened thereon by welding or riveting.

In the exterior of housing 29, immediately above the part of lever 40 that extends outwardly through opening 41, I mount a block 44 provided with an internally threaded sleeve 46 in which a thumbscrew 47 is supported. The distal end 49 of thumbscrew 47 is preferably formed with a rounded point to bear upon the upper side of lever 40.

A friction pad 50 is bonded or affixed to the underside of lever 40, being precisely located on the centerline of beam 7 and bob 10. The adjacent side of bob 10, at the bottom of eye 11 is ground or machined to a slightly concave curvature of the same radius of curavture as ball surface 20 and socket of eye 14, the friction pad 50 likewise having the same radius of curvature as ball surface 20 to prevent impairment of the pendulum setting when lever 40 is depressed to bear against bob 10 by adjustment of thumbscrew 47.

To prevent the intrusion of dust, moisture, and wind, a flexible bellows seal 56 may be mounted around aperture 41 and lever 40 and bonded or fastened to the wall of housing cylinder 29 in the most convenient manner. Other flexible seals also can be employed to seal the interior, such a seal 57 being mounted around the inner side of collar flange 33 and ring 34, and another seal 59 mounted between beam 7 and the interior wall of housing sleeve 26 generally as shown.

To damp and stabilize bob 10 in relation to true vertical I provide, in one preferred form thereof, a flexible cup 60 mounted in the bottom of end cap 31, the cup 60 being fabricated of any durable flexible material such as natural or synthetic rubber or the like bonded around the interior wall of the sleeve 31. It is preferred that the rim 61 of the cup extend well above the point 13 of bob 10. The cup 60 is filled more than half full with a damping material 62 such as plastic or glass micro-spheres. Fine silicon sand or metal particles could serve as alternative damping material. Beneath the cup 60 and in the bottom of end cap 31, I provide a flat disc or piston 63 mounted on the end of a plunger 64 that extends through a sleeve 66 provided in the center of end cap 31 in any well known manner. The plunger 64 preferably terminates in a knob 67 and is operated by manually moving the plunger 64 upwardly against the underside of cup 60 which flexes upwardly to position the damping material 62 therein around point 13 of bob 10.

To establish true vertical with the device of my invention as shown in FIGURES 1 and 2, clamp 34 is loosened to free the upper end of beam 7 and thumbscrew 47 is adjusted out of engagement with lever 40 freeing bob 10 so the pendulum beam 7 swings freely under the influence of momentum and gravity. To damp oscillations of the pendulum, plunger 64 is manually pushed or flicked with the finger several times (usually two or three times is sufficient) to raise the damping material 62 into friction engagement with the point 13 of bob 10 quickly bringing the bob to rest into position which precisely indicates and establishes true vertical. Thumbscrew 47 is turned downwardly against lever 40 biasing friction pad 50 into engagement with the concave surface at the bottom of bob eye 11 to lock bob 10 in position. Clamp 34 is next carefully tightened to lock the upper portion of beam 7 in position. Thus it will be seen that an instrument mounted in the adaptor 9 is firmly locked in position oriented with a fixedly established true vertical.

The device of my present invention can readily be adapted for more or less permanent or stationary applications, on an inspection table or optical bench for example, with a bench plate 71, as shown in FIGURE 6, by replacing the end cap 31 of FIGURES 1 and 2 with a reservoir 74 adapted to retain a quantity of the non-linear material to damp and stabilize the plumb bob, which material is supplied through filler well 76 mounted in the reservoir wall.

For the foregoing I prefer to use a thermosetting plastic supplied through filler well 76 in its liquid state but precatalyzed to harden as the oscillating plumb bob is damped and finally hardening around the plumb bob to firmly stabilize the bob in its precise vertical indicating position. Since the use of thermosetting resins is well known and old in the art, I do not deem it necessary to furnish detailed descriptions herein of the various kinds and methods of their use.

Where it is more desirable to employ a low melting-point material such as wax or paraffin, the material is melted and then poured into the reservoir 74 just prior to establishing true vertical. A more elaborate arrangement for melting the material in situ can be constructed (but is not shown herein) in which battery operated heating elements may be embedded in the wall of the reservoir if desired.

In either case the pendulum oscillates seeking true vertical while the hardening damping material through which the bob 10 traverses exerts a gradually increasing friction force thereon until the bob comes to rest with the pendulum beam 7 aligned with true vertical. The material quickly sets up around the point 13 of the bob 10 to substantially permanently stabilize an instrument mounted in adaptor 9 at the upper end of beam 7.

While I have described and shown a conventionally shaped bob 10, it may be desirable or even preferred in connection with the damping material to form the bob 10 with two points equally spaced on either side of dead center generally as shown in FIGURE 7. It will readily be seen that with the hardening of the damping material around points 80 and 81 rotational motion of the bob is prevented.

While I have described and shown the level establishing device of my present invention in two of its preferred embodiments, other modifications and embodiments will occur to those skilled in the art. I deem all such modifications and embodiments to be within the spirit and scope of my invention.

What is claimed is:
1. A level establishing device comprising:
   a pendulum column,
   instrument adaptor means at one end of said column for mounting a sighting instrument,
   said column having an eye extending transversely therethrough adjacent to said adaptor means,
   a plumb bob at the other end of said column for providing a pendulum weight,
   a housing for said pendulum column,
   arbor means extending through the eye adjacent to said adaptor means for freely suspensively supporting said pendulum column in said housing, and means for damping oscillations of said pendulum column comprising a cup member mounted in said housing beneath said bob, a fluid material being contained in said cup member and means for selectively positioning said cup member so as to bring said fluid material into engagement with said bob wherein said bob has an eye extending traversely therethrough and having a bottom face thereon, and further including a lock bar means for locking said bob to said housing, said lock bar means being resiliently supported on said housing and extending through and normally out of contact with the eye in said bob, said bar means having friction material thereon for engaging said bob and further including a means on said housing for deflecting and holding said bar in engagement with said bottom face.

2. The device of claim 1 wherein said means for positioning said cup member comprises a plunger slidably extending through the bottom of said housing, said plunger being adapted to engage the bottom of said cup member.

3. The device of claim 1 and further including clamp means for locking said one end of said pendulum column to said housing.

References Cited

UNITED STATES PATENTS

| | | | |
|---|---|---|---|
| 566,555 | 8/1896 | Appleton | 33—221 |
| 2,493,946 | 1/1950 | Craft et al. | 33—220 |
| 2,578,062 | 12/1951 | Greene | 33—216 |
| 2,775,044 | 12/1956 | Beebout | 33—221 |
| 802,071 | 10/1905 | Bawden | 33—205.4 |
| 821,048 | 5/1906 | Marriott | 33—205.4 |
| 1,859,420 | 5/1932 | Winn | 33—205.4 |
| 1,959,666 | 5/1934 | Grant | 33—205.4 |

LEONARD FORMAN, Primary Examiner

DENNIS A. DEARING, Assistant Examiner

U.S. Cl. X.R.

248—180